United States Patent
Wu et al.

(10) Patent No.: US 10,636,200 B2
(45) Date of Patent: Apr. 28, 2020

(54) ELECTRONIC DEVICE, METHOD FOR DISPLAYING AN AUGMENTED REALITY SCENE AND NON-TRANSITORY COMPUTER-READABLE MEDIUM

(71) Applicant: HTC Corporation, Taoyuan (TW)

(72) Inventors: Yu-Ting Wu, Taoyuan (TW); Ching-Yang Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/251,088

(22) Filed: Jan. 18, 2019

(65) Prior Publication Data

US 2019/0228568 A1 Jul. 25, 2019

Related U.S. Application Data

(60) Provisional application No. 62/619,130, filed on Jan. 19, 2018.

(51) Int. Cl.
| | |
|---|---|
| *G06T 15/50* | (2011.01) |
| *G06T 15/60* | (2006.01) |
| *G06T 19/00* | (2011.01) |
| *G06T 15/20* | (2011.01) |
| *G06T 3/40* | (2006.01) |

(52) U.S. Cl.
CPC .......... *G06T 15/506* (2013.01); *G06T 3/4038* (2013.01); *G06T 15/205* (2013.01); *G06T 15/60* (2013.01); *G06T 19/006* (2013.01); *G06T 2215/12* (2013.01); *G06T 2215/16* (2013.01)

(58) Field of Classification Search
CPC .............................. G06T 15/506; G06T 15/60
See application file for complete search history.

(56) References Cited

U.S. PATENT DOCUMENTS

| | | | | |
|---|---|---|---|---|
| 9,355,433 | B1* | 5/2016 | Adsumilli | G06T 3/4038 |
| 2007/0236485 | A1* | 10/2007 | Trepte | G06T 15/60 |
| | | | | 345/207 |

(Continued)

OTHER PUBLICATIONS

Paul Debevec, "Image-based lighting", Mar. 1, 2002, Retrieved from the Internet: http://delivery.acm.org/10.1145/1200000/1198709/a3-debevec.pdf?ip=145.64.134.242&id=1198709&acc=ACTIVE%20SERVICE&key=E80E9EB78FFDF9DF.4D4702B0C3E38B35.4D4702B0C3E38B35.4D4702B0C3E38B35&_acm_=1539600866_c5125685eeea219887cb943d31b857ca.

(Continued)

*Primary Examiner* — Terrell M Robinson
(74) *Attorney, Agent, or Firm* — CKC & Partners Co., LLC

(57) ABSTRACT

An electronic device, method for displaying an augmented reality scene and non-transitory computer-readable medium are provided in this disclosure. The electronic device includes a camera unit, a displayer, and a processor. The processor electrically connected to the camera unit and the displayer. The camera unit is configured for capturing a plurality of images of the physical environment. The displayer is configured for displaying an AR image. The processor is configured for stitching the plurality of images to generate an environment image; calculating an environment light and a reflection of the physical environment corresponding to the virtual object according to the environment image; analyzing direction of a lighting to calculate a shadow corresponding to the virtual object according to the environment image; and rendering the virtual object on the AR image according to the environment light, the reflection, and the shadow.

17 Claims, 14 Drawing Sheets

(56) References Cited

U.S. PATENT DOCUMENTS

| | | | | |
|---|---|---|---|---|
| 2009/0141027 A1* | 6/2009 | Sato | ............... | G01B 11/002 345/426 |
| 2015/0301599 A1* | 10/2015 | Miller | ............... | G06F 3/011 345/156 |
| 2018/0249062 A1* | 8/2018 | Jin | ............... | G06F 3/011 |

OTHER PUBLICATIONS

Auliclic: "How to us Photo Sphere in Android", Youtube, Jan. 8, 2004, Retrieved from the Internet: https://www.youtube.com/watch?v=f72U690xJ1g.

Claus B. Madsen et al, "Realtime image-based lighting for outdoor augmented reality under dynamically changing Illumination conditions", Proceedings: International Conference on Graphics Theory and Applications, Jan. 1, 2006, pp. 364-371.

Gannon Burgett, "Google's 360o Panorama App 'Photo Sphere' Now Available on iOS", Aug. 19, 2014, Retrieved from the Internet: https://petapixel.com/2014/08/19/googles-360o-panorama-app-photo-sphere-makes-way-ios/.

Corresponding European search report dated Apr. 15, 2019.
Corresponding European communication dated Jul. 26, 2019.

* cited by examiner

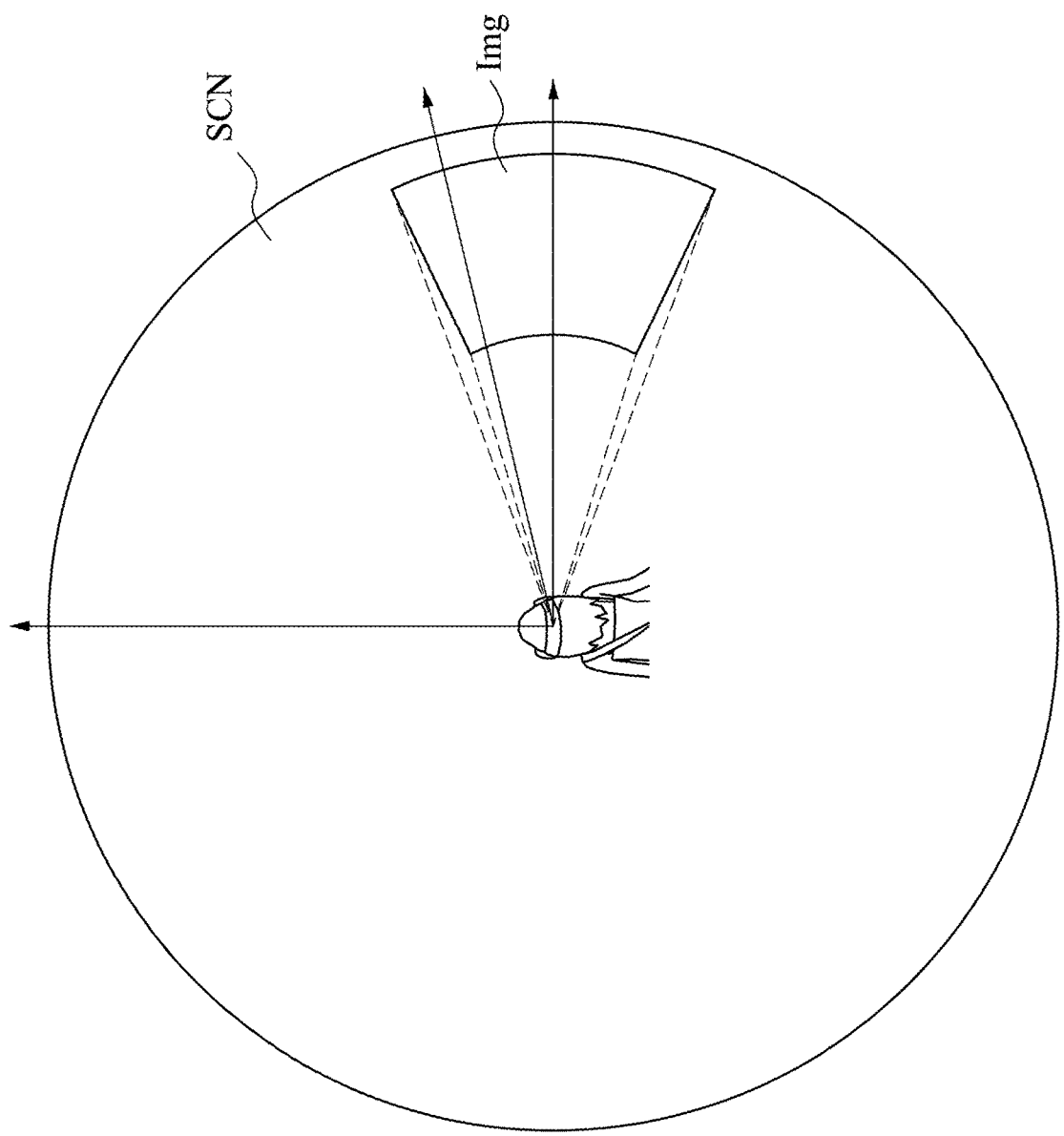

ELECTRONIC DEVICE, METHOD FOR DISPLAYING AN AUGMENTED REALITY SCENE AND NON-TRANSITORY COMPUTER-READABLE MEDIUM

CROSS-REFERENCE TO RELATED APPLICATION

This application claims priority to U.S. Provisional Application Ser. No. 62/619,130, filed on Jan. 19, 2018, which is herein incorporated by reference.

BACKGROUND

Field of Invention

The present application relates to an electronic device and method for displaying an augmented reality scene and non-transitory computer-readable medium. More particularly, the present application relates to an electronic device and method for displaying a virtual object in the augmented reality scene and non-transitory computer-readable medium.

Description of Related Art

In the augmented reality (AR) system or the mixed reality (MR) system, if the virtual object is blended into the real world environment, it is need to make the lighting configuration of the virtual object and the lighting of real-world environment as similar as possible. Because of the performance issue, existing real-time environment lighting techniques usually do not simulate shadows. However, the shadows of the virtual object can provide depth information to viewers and greatly improve rendering quality. Therefore, an electronic device for capturing the lighting configuration of real-world environment into the mixed reality or the augmented reality system is required.

SUMMARY

An aspect of the disclosure is to provide an electronic device located in a physical environment. The electronic device includes a camera unit, a displayer and a processor. The camera unit is configured to capture a plurality of images of the physical environment. The displayer is configured to display an AR image, wherein content of the AR image comprises a virtual object and object corresponding to the physical environment. The processor is electrically connected to the camera unit and the displayer. The processor is configured to stitch the plurality of images to generate an environment image; calculate an environment light and a reflection of the physical environment corresponding to the virtual object according to the environment image; analyze direction of a lighting to calculate a shadow corresponding to the virtual object according to the environment image; and render the virtual object on the AR image according to the environment light, the reflection, and the shadow.

Another aspect of the disclosure is to provide a method for displaying an augmented reality scene. The method includes operations of: capturing a plurality of images of the physical environment by a camera unit; stitching the plurality of images to generate an environment image by a processor; calculating an environment light and a reflection of the physical environment corresponding to a virtual object according to the environment image by the processor; analyzing direction of a lighting to calculate a shadow corresponding to the virtual object according to the environment image by the processor; rendering the virtual object on an AR image according to the environment light, the reflection, and the shadow by the processor; and displaying the AR image by a displayer, wherein content of the AR image comprises the virtual object and object corresponding to the physical environment.

Another aspect of the disclosure is to provide a non-transitory computer-readable medium including one or more sequences of instructions to be executed by a processor of an electronic device for performing a method for displaying an augmented reality scene, wherein the method includes operations of: capturing a plurality of images of the physical environment by a camera unit; stitching the plurality of images to generate an environment image by a processor; calculating an environment light and a reflection of the physical environment corresponding to a virtual object according to the environment image by the processor; analyzing direction of a lighting to calculate a shadow corresponding to the virtual object according to the environment image by the processor; rendering the virtual object on an AR image according to the environment light, the reflection, and the shadow by the processor; and displaying the AR image by a displayer, wherein content of the AR image comprises the virtual object and object corresponding to the physical environment.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A is a schematic diagram illustrating an AR scene according to an embodiment of this disclosure.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
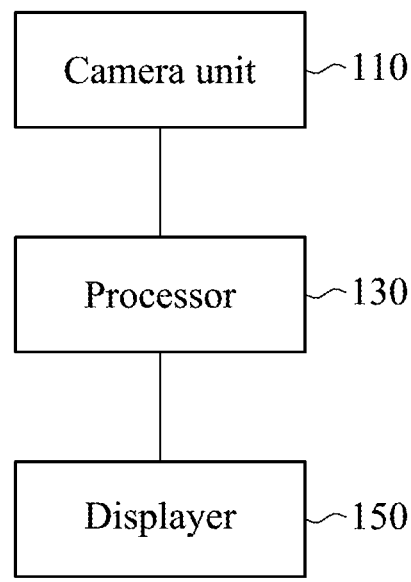
FIG. 1 is a functional block diagram illustrating an electronic device according to an embodiment of the disclosure.

Reference is made to FIG. 1, which is a functional block diagram illustrating an electronic device 100 according to an embodiment of the disclosure. As shown in FIG. 1, the electronic device 100 includes a camera unit 110, a processor 130 and a displayer 150. The processor 130 is electrically connected to the camera unit 110 and the displayer 150. In some embodiment, the electronic device 100 can be a device of an augmented reality (AR) system or a mixed reality (MR) system, such as a head-mounted display (HMD). The processor 130 can be implemented by a central processing unit, a control circuit and/or a graphics processing unit. When a user wears the electronic device 100, the displayer 150 will cover visions of the user, and the displayer 150 is configured for displaying a mixed reality scene or an augmented reality scene to the user.

The processor 130 is coupled to the displayer 150. The processor 130 is configured to process image/video data of the AR (or MR) scene to be displayed on the displayer 150. The AR/MR scene may include virtual objects (e.g. teapot, statue, glass, etc.) and/or the physical environment features (e.g. walls, doors, tables, windows, etc.).

Figure 2:
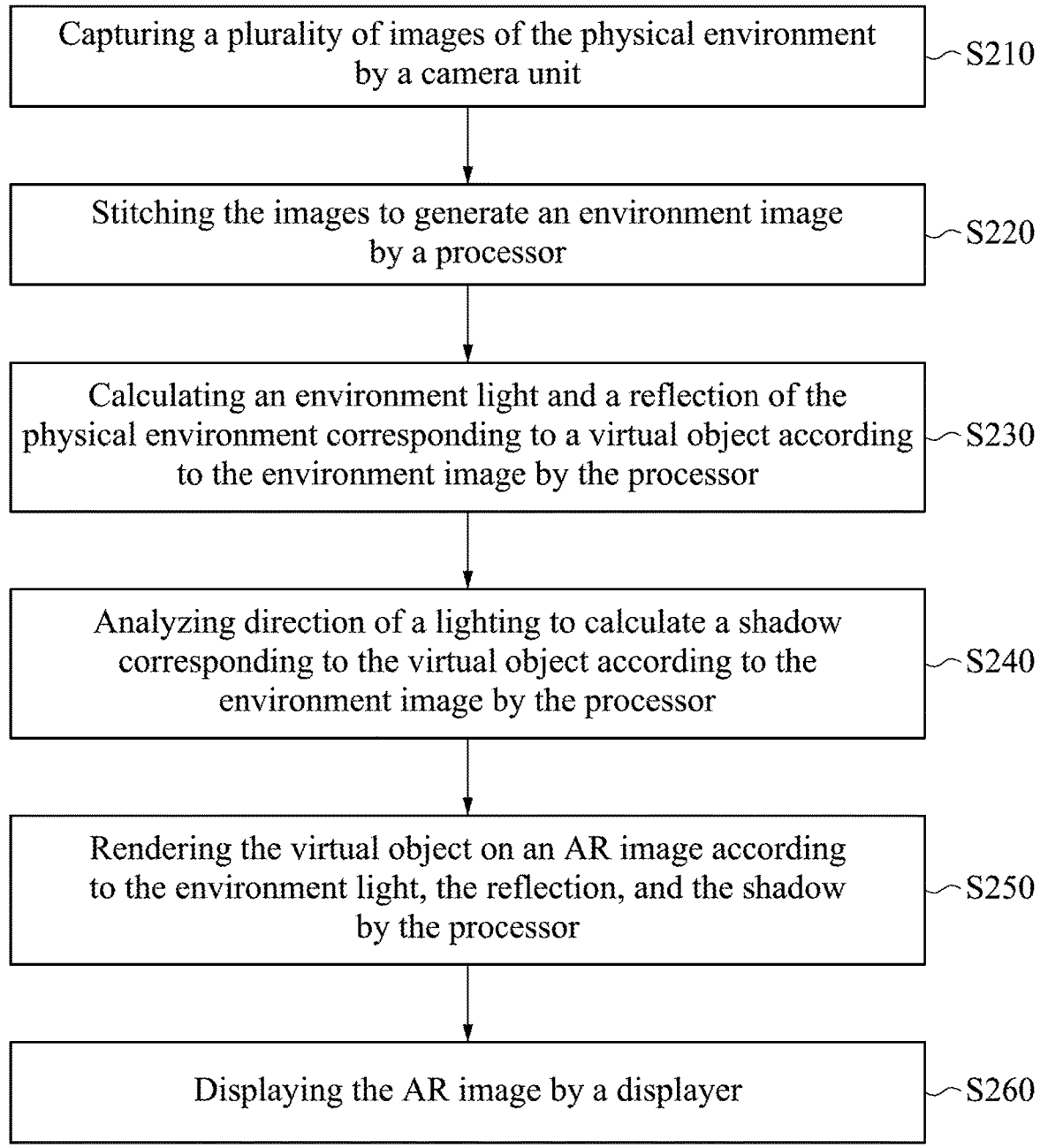
FIG. 2 is a flow diagram illustrating a method according to an embodiment of this disclosure.

Reference is made to FIG. 2, which is a flow diagram illustrating a method 200 according to an embodiment of this disclosure. In the embodiment, the method 200 for displaying an augmented reality scene can be utilized to perform computations for rendering the virtual object and to combine the virtual objects and the physical environment features together to form AR images. In other words, the content of AR images has the virtual object and the object corresponding to the physical environment. Thus, the AR scene is formed by a plurality of AR images.

Reference is made to FIG. 1 and FIG. 2. As the embodiment shown in FIG. 2, the method 200 firstly executes step S210 to capture a plurality of images of the physical environment by a camera unit 110. Reference is made to FIG. 3A, which is a schematic diagram illustrating an AR scene SCN according to an embodiment of this disclosure. In the embodiment, the AR scene SCN can include image data Img with a sphere shaped AR scenario surrounding the user wearing the electronic device 100. The disclosed is not limited to the sphere shaped AR scenario. In another embodiment, the AR scene SCN can include image data Img with a hemisphere shaped AR scenario, a circular ring shaped AR scenario or other equivalent shapes.

Figure 3B:
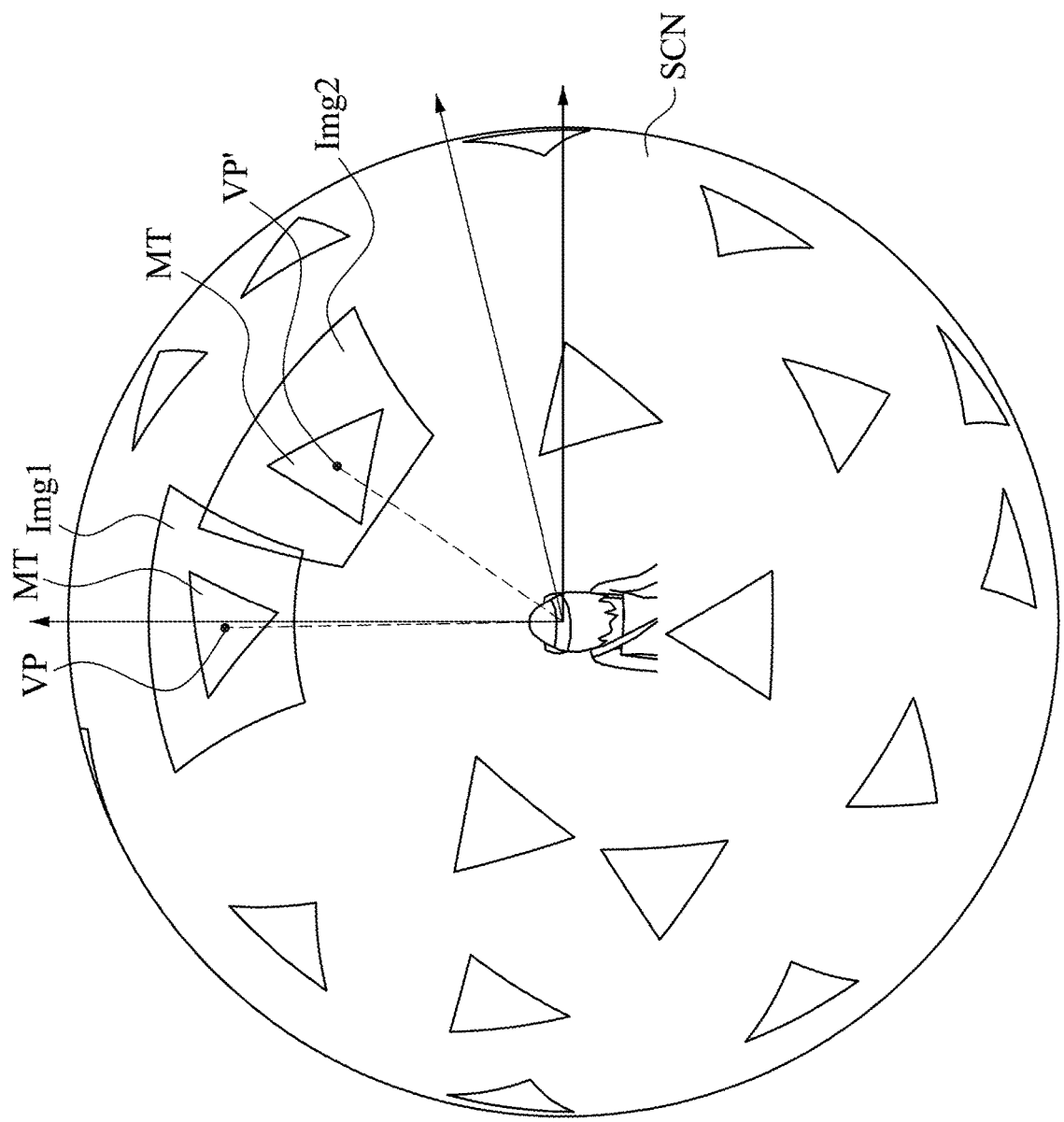
FIG. 3B is a schematic diagram illustrating the matching target and the initial view point according to an embodiment of this disclosure.

Afterward, the method 200 executes step S220 to stitch the images to generate an environment image by a processor 130. Reference is made to FIG. 3B. Reference is made to FIG. 3B, which is a schematic diagram illustrating the matching target MT and the initial view point VP according to an embodiment of this disclosure. In the embodiment, the environment image can be realized to a skybox of the physical environment. As shown in FIG. 3B, when a view point VP is matched one of a plurality of matching targets MT, the camera unit 110 of the electronic device 100 is configured to capture an image Img1 of the AR scene SCN. It is noticed that each image captured from the camera unit 110 includes a position data of the camera unit 110.

Afterwards, as shown in FIG. 3B, the view point VP is moved and rotated along with the electronic device 100, and the plurality of matching targets MT are around of the view point VP. When the view point VP is matched one of the matching targets MT, the camera unit 110 is configured to captured an initial image Img1, and the coordinate of the initial position of the camera unit 110 is Ip(0, 0, 0).

In an embodiment, an assisting target can be utilized to help the user to align the matching target MT. The assisting target can be implemented as the same shape of the matching target MT or different shape of the matching target MT. The number of the matching target MT can be set to be larger than 12. The shape and the number of assisting target should not be limited thereto.

Figure 3C:
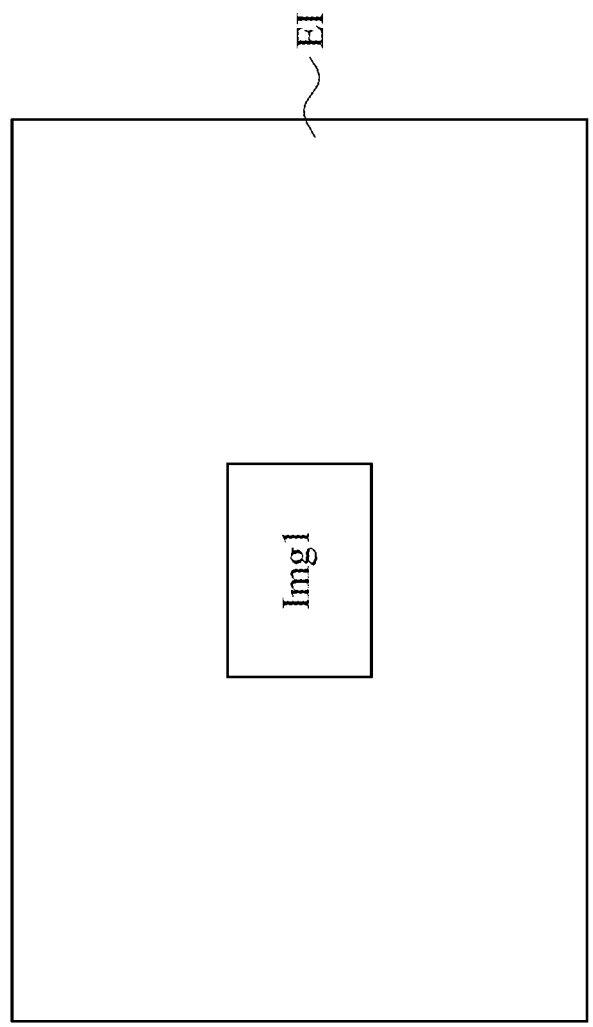
FIG. 3C is a schematic diagram illustrating the environment image EI according to an embodiment of this disclosure.

Reference is made to FIG. 3C, which is a schematic diagram illustrating the environment image EI according to an embodiment of this disclosure. As shown in FIG. 3C, the processor 130 is configured to stitch the initial image Img1 into the environment image EI. When the initial image Img1 is stitched into the environment image EI, the view point VP' is moved and rotated to a new position and matched another matching target MT, the camera unit 110 is configured to capture another image Img2.

Afterwards, the processor 130 is further configured to calculate a quality of current image Img2 according to a distance between a current position and an initial position. The current position is corresponding to the position of the camera unit 110 captured the image Img2. The quality of current image Img2 could be calculated by Formula 1. For example, the coordinate of the initial position of the camera unit 110 is Ip(0, 0, 0) and the coordinate of the current position of the camera unit 110 is Cp(10, 10, 10). Therefore, the quality of current image Img2 can be obtained by the Formula 1. If the distance between the current position and the initial position is farther, the quality of current image Img2 would be worse, and thus the distance has an inverse relation with the quality.

$$Qp = \text{Distance}(Cp, Ip)^{-1} \quad \text{(Formula 1)}$$

Figure 3D:
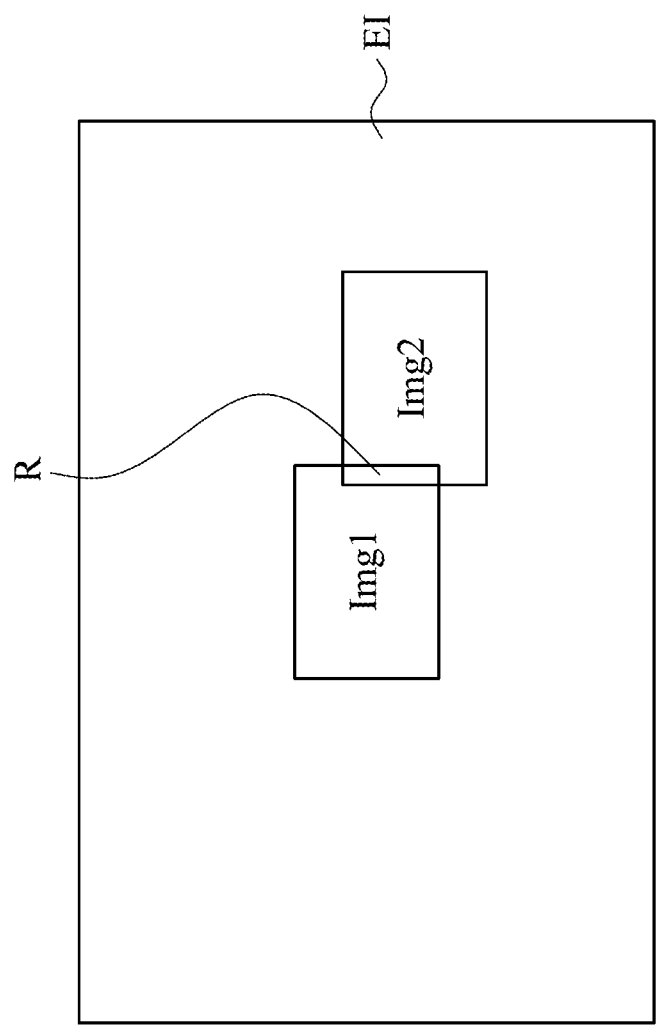
FIG. 3D is a schematic diagram illustrating the environment image according to an embodiment of this disclosure.

Reference is made to FIG. 3D, which is a schematic diagram illustrating the environment image EI according to an embodiment of this disclosure. As shown in FIG. 3D, if the quality of current image Img2 is larger than a threshold, the processor 130 is configured to stitch the current image Img2 into the environment image EI. The initial image Img1 and the current image Img2 is overlapped in the region R. The processor 130 is configured to compare the quality of the initial image Img1 and the quality of the current image Img2. In an embodiment, the image with lower quality will be ignored, the overlapped region R will be updated to the image with better quality. In this case, quality of the initial image Img1 is better than quality of the current image Img2. Therefore, the overlapped region R will be updated to data of the initial image Img1.

In another embodiment, in the overlapped region R, the image with lower quality will be blended with the image with better quality. In this case, the overlapped region R will be updated to data of the initial image Img1 blended with the current image Img2. The ratio of blending can be adjusted. For example, if the initial image Img1 has the better quality, the ratio of blending of the initial image Img1 can be set as 0.8, and the ratio of blending of the current image Img2 can be set as 0.2. However, the disclosure is not limited thereto.

In the embodiment, as shown in FIG. 3B, when the view point VP is matched all of the matching target MT, it is can realize that the environment image EI is generated. It is noticed that, the images captured by the camera unit 110 is corresponding to the physical environment, and thus the environment image EI is a skybox corresponding to the physical environment.

Figure 4:
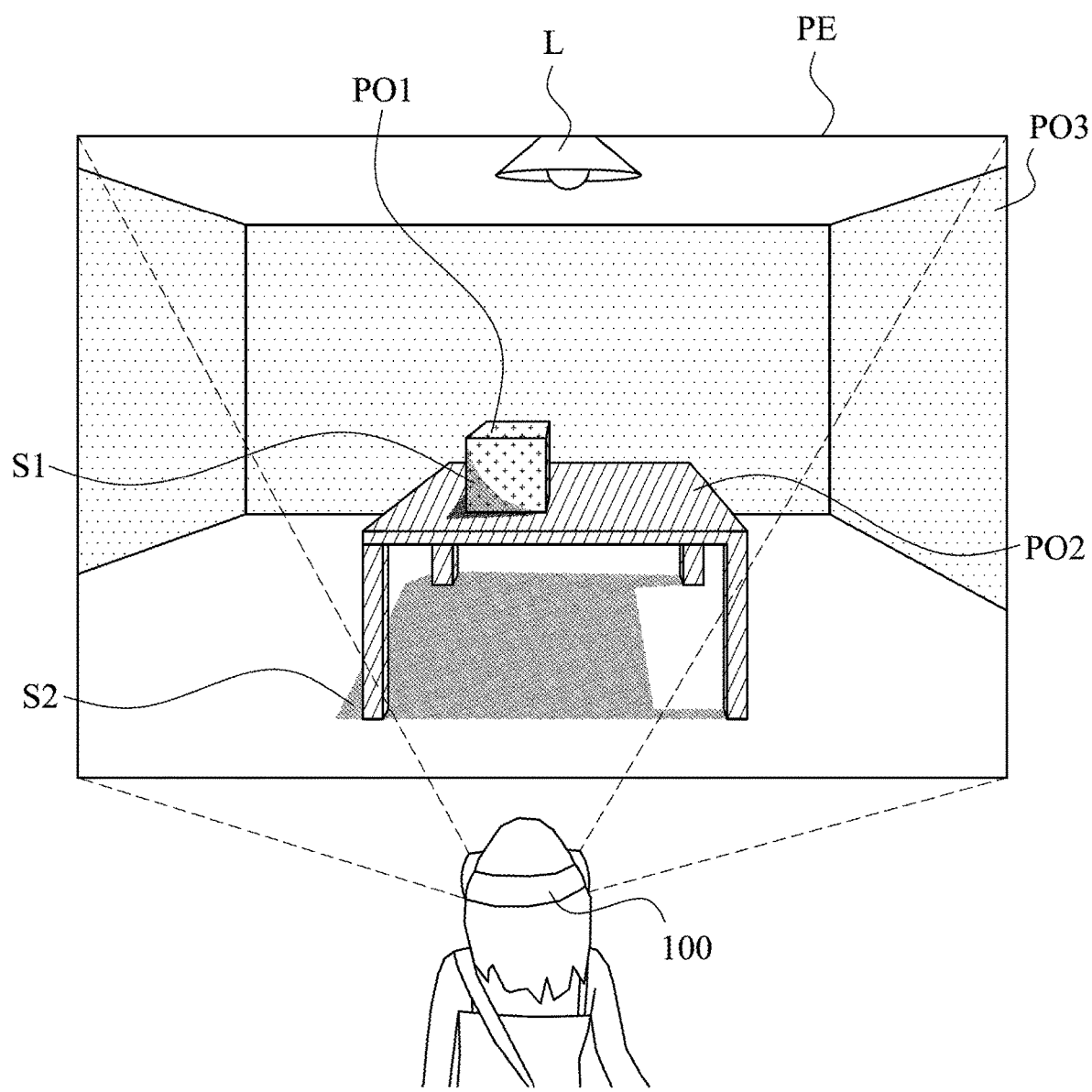
FIG. 4 is a schematic diagram illustrating views of the electronic device in the physical environment according to an embodiment of this disclosure.

Reference is made to FIG. 4, which is a schematic diagram illustrating views of the electronic device 100 in the physical environment PE according to an embodiment of this disclosure. In the embodiment, the camera unit 110 of the electronic device 100 is configured to capture a plurality of images of the physical environment PE. There are a lamp L and three objects PO1, PO2 and PO3 in the physical environment PE. The objects PO1, PO2 and PO3 have different texture.

Figure 5A:
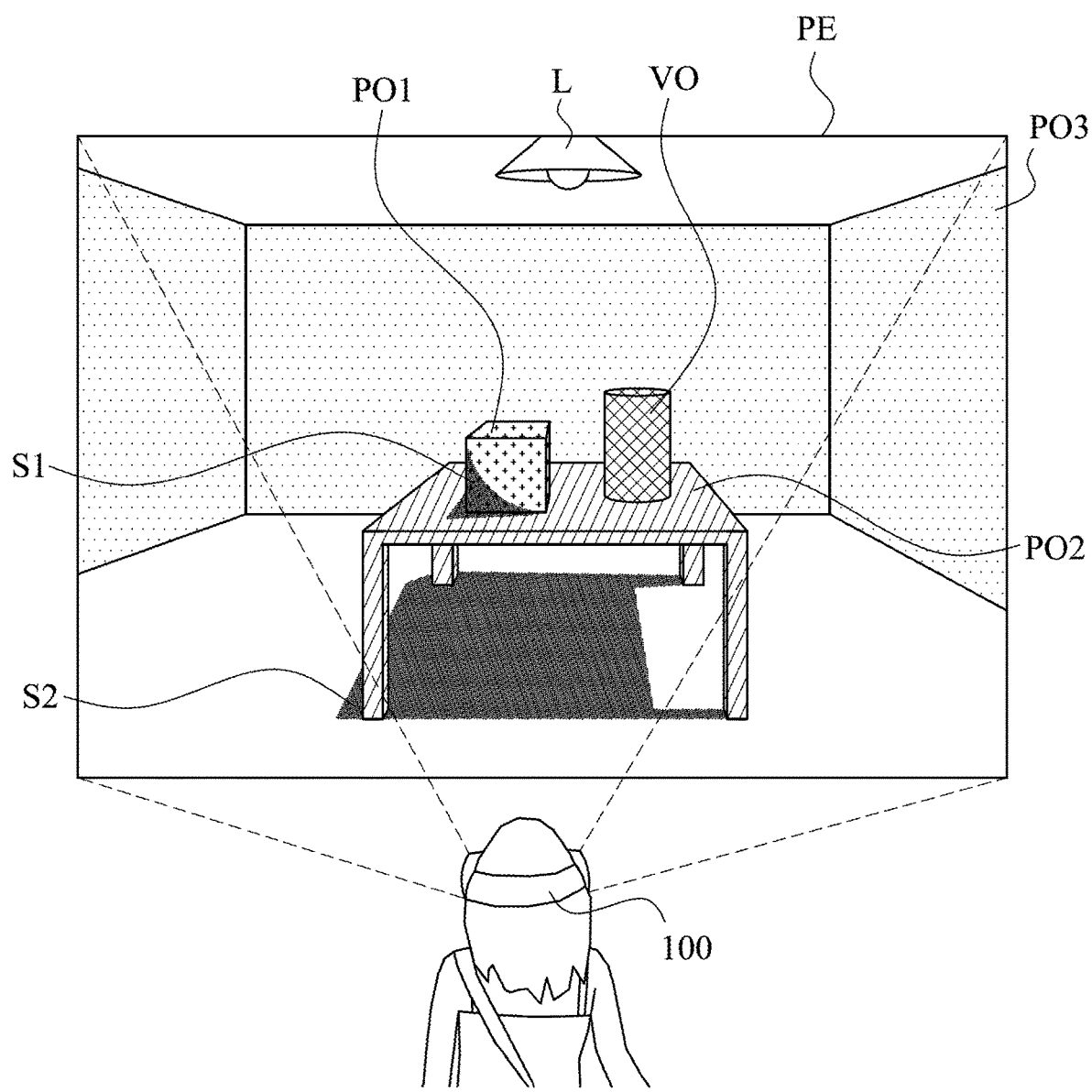
FIG. 5A is a schematic diagram illustrating the virtual object according to an embodiment of this disclosure.

Reference is made to FIG. 5A, which is a schematic diagram illustrating the virtual object VO according to an embodiment of this disclosure. In the embodiment, when the processor 130 is configured to render the virtual object VO into the physical environment PE, the user can see the virtual object VO in the AR scene SCN via the electronic device 100. It is assumed that the virtual object VO is a bottle with metal material. As shown in FIG. 5A, the texture of the virtual object VO is a default texture (i.e. net texture). The object PO1 has the shadow S1 and the object PO2 has the shadow S2, due to lighting from the lamp L. However, in this case, because the virtual object VO with the default texture is unmatched with surrounding objects in the physical environment PE, the virtual object VO rendered by the processor 130 may be seen unrealistic in the physical environment PE.

Afterward, the method 200 executes step S230 to calculate an environment light and a reflection of the physical environment PE corresponding to a virtual object VO according to the environment image EI by the processor 130. In the embodiment, the processor 130 is configured to utilize a spherical harmonics (SH) function to calculate the environment light corresponding to the virtual object VO according to the environment image EI. In the graphics engine (e.g. Unity 3D, Unreal Engine, etc), spherical harmonics (SH) function can be utilized to indirect lighting (ambient occlusion, global illumination, etc.). Therefore, we can utilize the spherical harmonics (SH) function to generate the environment light according to the environment image EI.

Afterwards, the processor 130 is configured to generate a cube map according to the environment image EI, and to calculate the reflection corresponding to the virtual object VO according to the cube map. In the 3D computer graphics, cube maps generally include six texture map surfaces, each cube face can be represented as some environmental detail, such as illuminated color or texture. Therefore, the cube map may be used to impart realistic environmental lighting effects on the virtual object being rendered, giving the virtual object a realistic look and feel within the context of the scene.

Figure 5B:
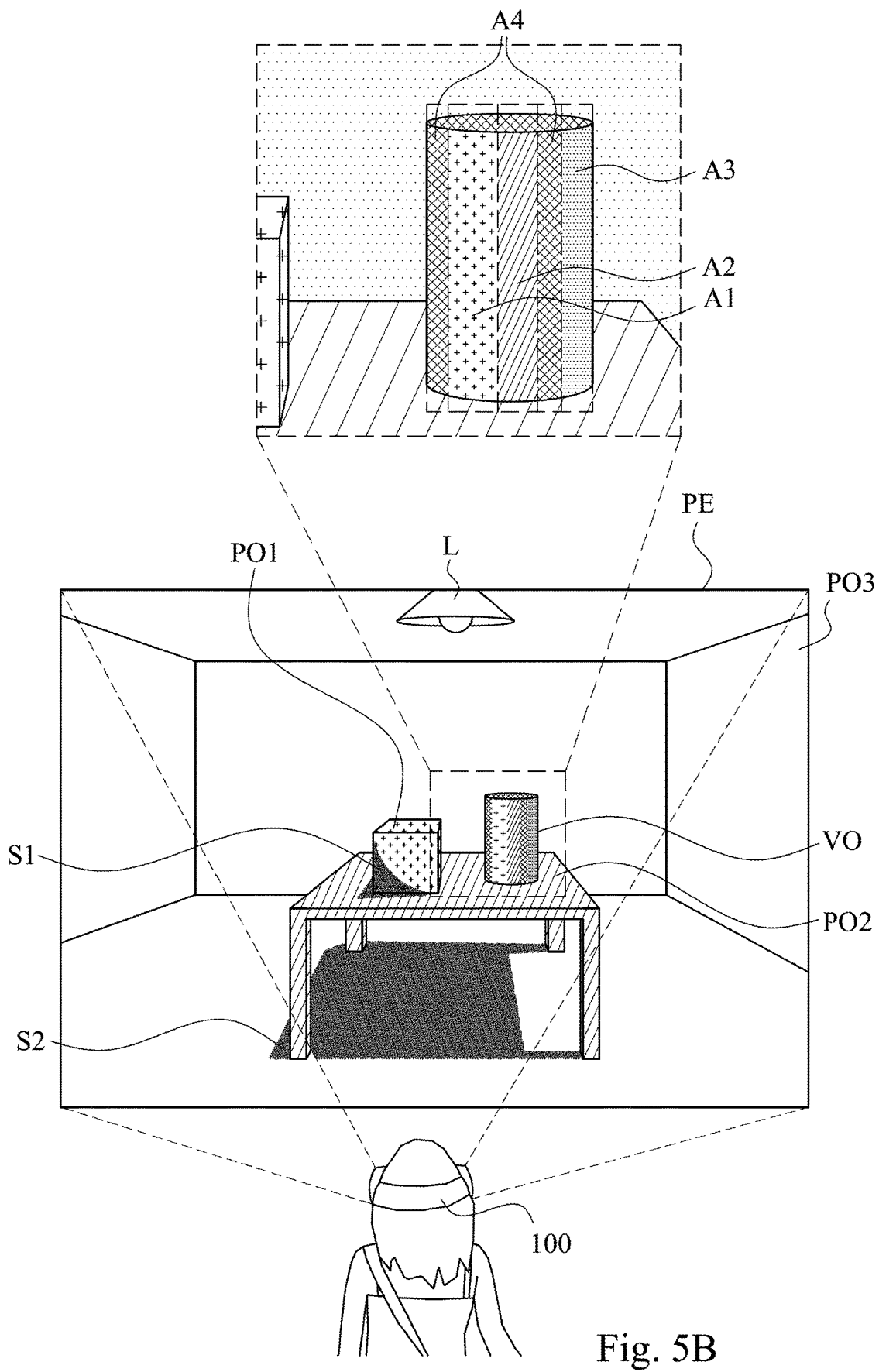
FIG. 5B is a schematic diagram illustrating the virtual object is rendered in the physical environment according to an embodiment of this disclosure.

Reference is made to FIG. 5B, which is a schematic diagram illustrating the virtual object VO is rendered in the physical environment PE according to an embodiment of this disclosure. As described above, with step S230, the environment light and the reflection of the physical environment PE corresponding to the virtual object VO can be calculated according to the environment image EI. For example, as shown in FIG. 5B, the texture of the object PO1 is a plus texture (i.e. "+") with red color; the texture of the object PO2 is a slash texture (i.e. "/") with brown color; the texture of the object PO3 is a dot texture (i.e. "•") with blue color, and the texture of the virtual object VO is the default texture (i.e. net texture) with gray color. After the step S230 is executed by the processor 130, the reflection from the object PO1 to the virtual object VO is calculated and is shown, for example, in an area A1 on the virtual object VO (i.e., plus texture shown within the area A1). By this analogy, the reflection from the object PO2 to the virtual object VO is calculated and is shown in, for example, an area A2 on the virtual object VO (i.e., slash texture shown within the area A2). The reflection from the object PO3 to the virtual object VO is calculated and is shown, for example, in an area A3 on the virtual object VO (i.e., dot texture shown within the area A3).

As shown in FIG. 5B, the appearance of the virtual object VO is now displayed as a rendered of textures (slash texture, plus texture, and dot texture) with colors from other objects in the physical environment PE. Furthermore, as shown in an area A4 on the virtual object VO, the texture of the virtual object VO is the default texture with gray color. It is appreciated that, instead of being directly and fully covered by reflections from other objects PO1~PO3, the surface (or appearance) of the virtual object VO is now blended with its own net texture and the reflections from textures of other objects PO1~PO3. However, the areas A1~A4 are just shown for easily illustrating. In practice, the colors of objects PO1-PO3 and the original color of the virtual object VO are mixed to render on the surface of the virtual object VO. It is noticed that the environment image EI can be utilized to generate the environment light and the reflection corresponding to the virtual object VO, and thus the virtual object VO generated after the step S230 can be more realistic than the virtual object VO shown in FIG. 5A.

Figure 6:
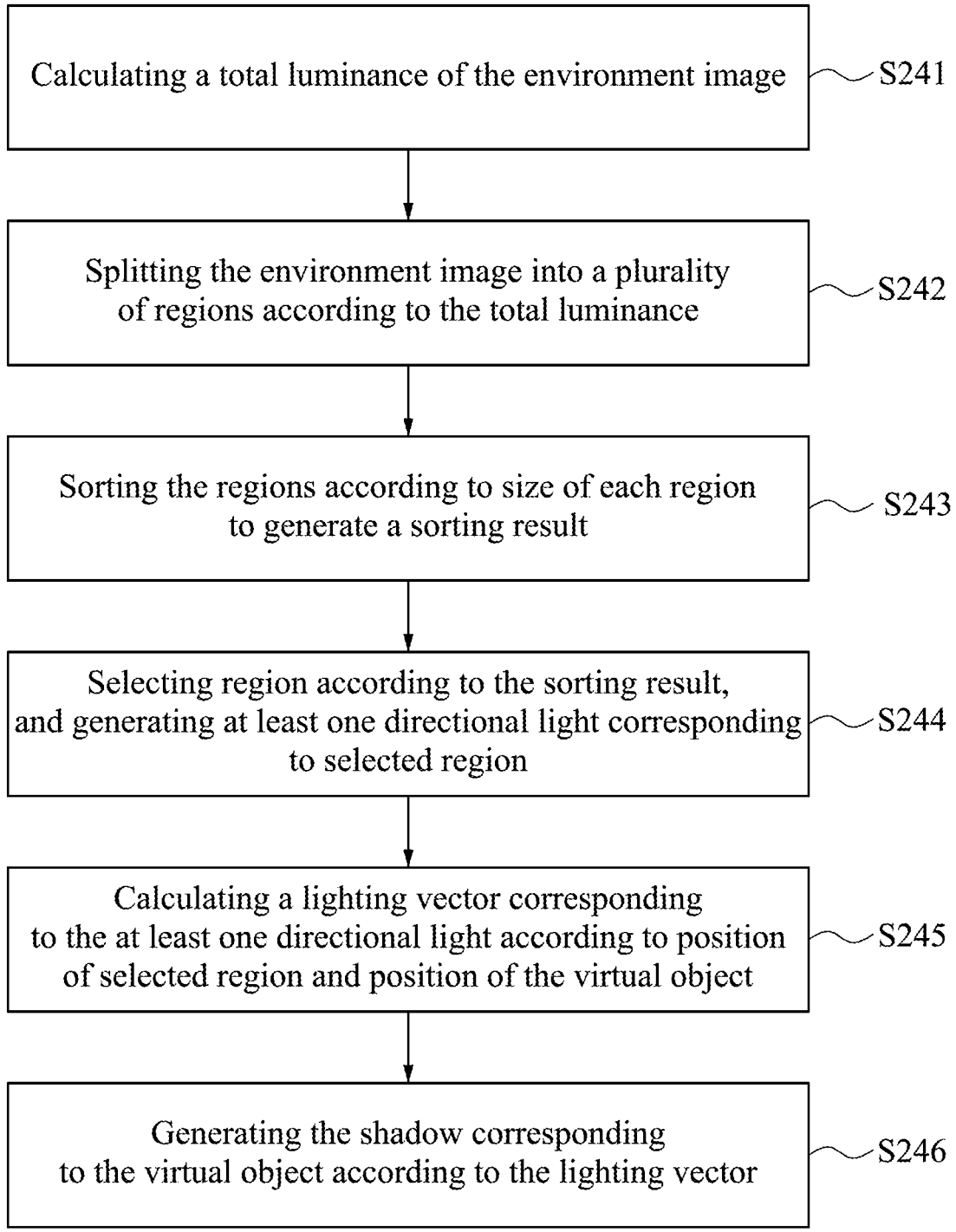
FIG. 6 is a flow diagram illustrating step S240 according to an embodiment of this disclosure.

Afterward, the method 200 executes step S240 to analyze direction of a lighting to calculate a shadow corresponding to the virtual object VO according to the environment image EI by the processor 130. The step S240 further includes steps S241~S246, reference is made to FIG. 6, which is a flow diagram illustrating step S240 according to an embodiment of this disclosure. As the embodiment shown in FIG. 6, the method 200 executes step S241 to calculate a total luminance of the environment image EI. In the embodiment, the processor 130 is configured to calculate the summation of the gray value of the environment image EI. For example, the total luminance of the environment image EI is 20000.

Figure 7A:
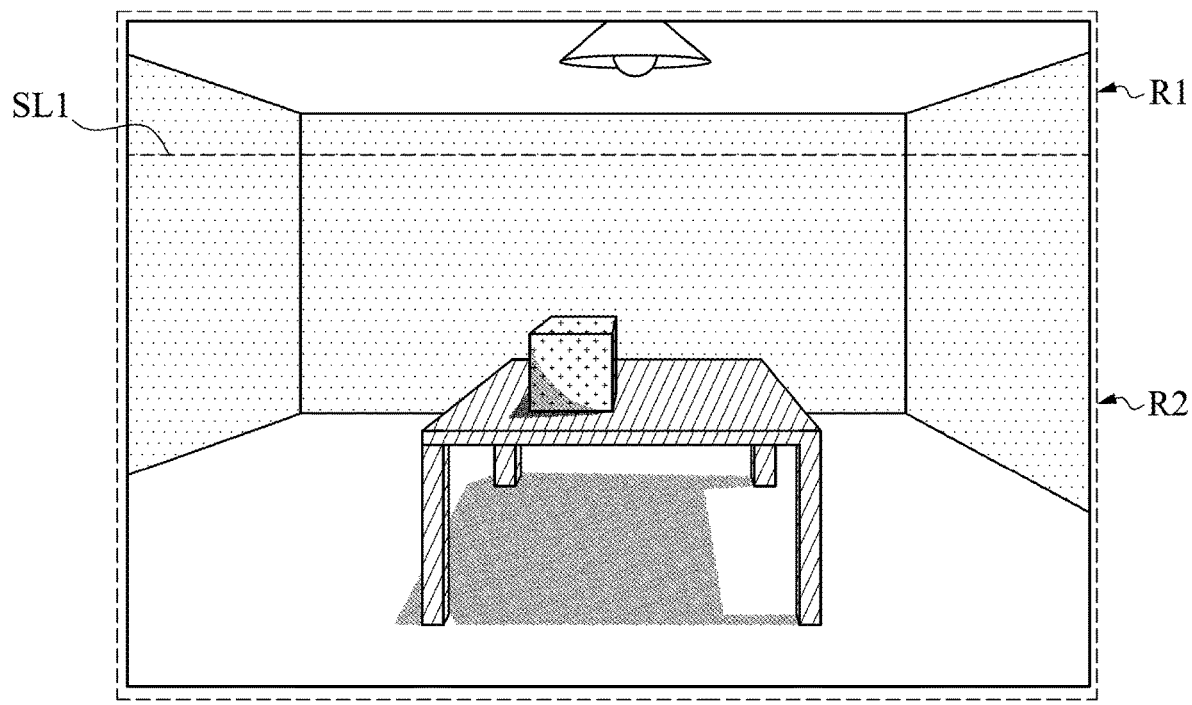
FIG. 7A is a schematic diagram illustrating the regions of the environment image according to an embodiment of this disclosure.

Afterward, the method 200 executes step S242 to split the environment image EI into a plurality of regions according to the total luminance. Reference is made to FIG. 7A, which is a schematic diagram illustrating the regions of the environment image EI according to an embodiment of this disclosure. As shown in FIG. 7A, the processor 130 is configured to split environment image EI into regions R1 and R2 by the splitting line SL1. The luminance of region R1 is equal to the luminance of region R2, and it means that the luminance of regions R1 and R2 are both 10000.

Figure 7B:
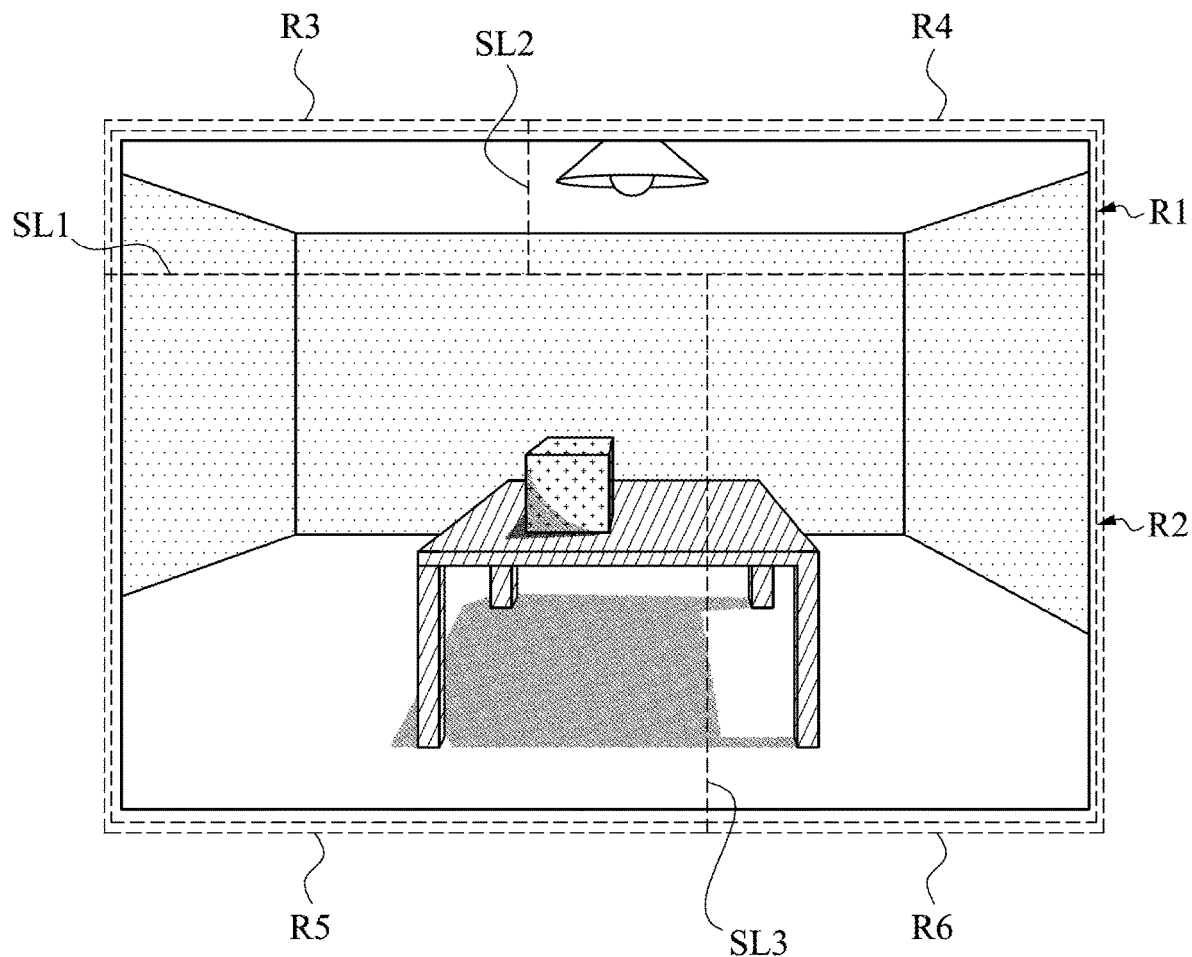
FIG. 7B is a schematic diagram illustrating the regions of the environment image according to an embodiment of this disclosure.

Afterwards, reference is made to FIG. 7B, which is a schematic diagram illustrating the regions of the environment image EI according to an embodiment of this disclosure. As shown in FIG. 7B, the processor 130 is further configured to split regions R1 into regions R3 and R4 by the splitting line SL2, and to split regions R2 into regions R5 and R6 by the splitting line SL3. The luminance of region R3 is equal to the luminance of region R4, and it means that the luminance of regions R3 and R4 are both 5000. The luminance of region R5 is equal to the luminance of region R6, and it means that the luminance of regions R5 and R6 are both 5000. The times of executions of the step S242 are setting by the number of splitting line or the luminance of region. If the number of executions of the step S242 is increasing, the summation of the luminance of region will be decreasing and the number of region is increasing.

Afterward, the method 200 executes step S243 to sort the regions according to size of each region to generate a sorting result. In aforesaid embodiment, each regions has similar luminance (i.e. 5000). If the size of region is smaller, the region will be lighting candidates. Therefore, it can be realized that the sorting result is arranged according to the size of the regions (from the largest size to the smallest size). In another embodiment, the sorting result can be arranged from the smallest size to the largest size. However, the disclosure is not limited thereto.

Afterward, the method 200 executes step S244 to select region according to the sorting result, and to generate at least one directional light corresponding to selected region. In aforesaid embodiment, if the processor 130 is configured to select the region with the smallest size, the selected region will be a light source and generate a directional light. In another embodiment, the processor 130 can select multiple of the region in sequence according to the sorting result, or the number of selected region can be set by user. However, the means of selected region should not be limited thereto.

Figure 8:
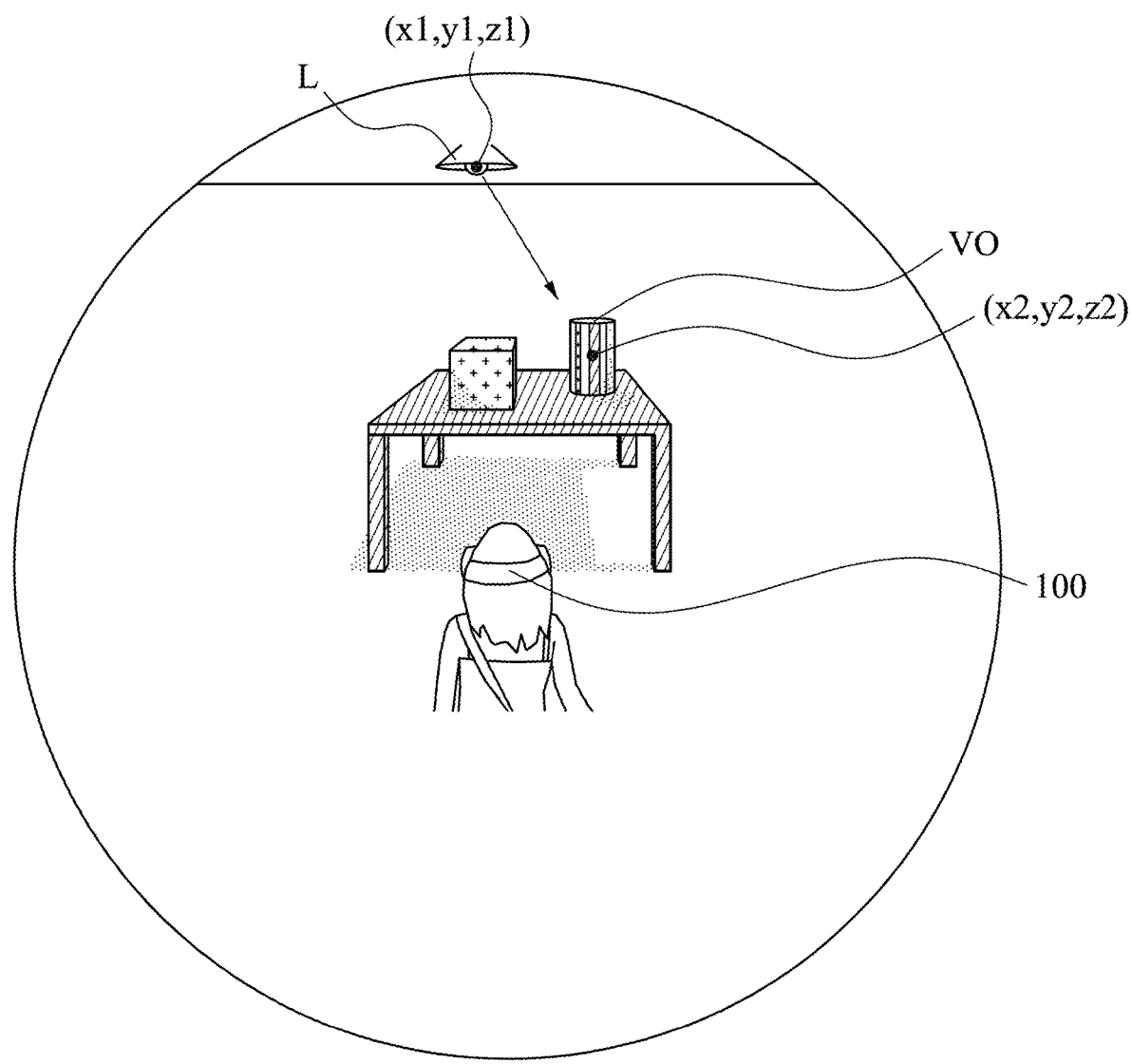
FIG. 8 is a schematic diagram illustrating the lighting vector in the physical environment according to an embodiment of this disclosure.

Afterward, the method 200 executes step S245 to calculate a lighting vector corresponding to the at least one directional light according to position of selected region and position of the virtual object VO. Reference is made to FIG. 8, which is a schematic diagram illustrating the lighting vector in the physical environment PE according to an embodiment of this disclosure. As the example shown in FIG. 8, because the selected region is a partial of the environment image EI, position of the selected region in the environment image EI can be obtained. In this case, the selected region is the region of the lamp L. Afterwards, because the AR scene SCN is generated by the environment image EI, the position of the lamp L in the sphere shaped AR scene SCN can be obtained (the coordinate of the z-axis can be obtained by a default value, multi-view sensor or depth sensor). For the similar reason, the position of the virtual object VO in the sphere shaped AR scene SCN can be obtained. The coordinate of the lamp L are (x1, y1, z1) and the coordinate of the virtual object VO are (x2, y2, z2). Therefore, the lighting vector can be calculated by the coordinate of the lamp L and coordinate of the virtual object VO.

Figure 9:
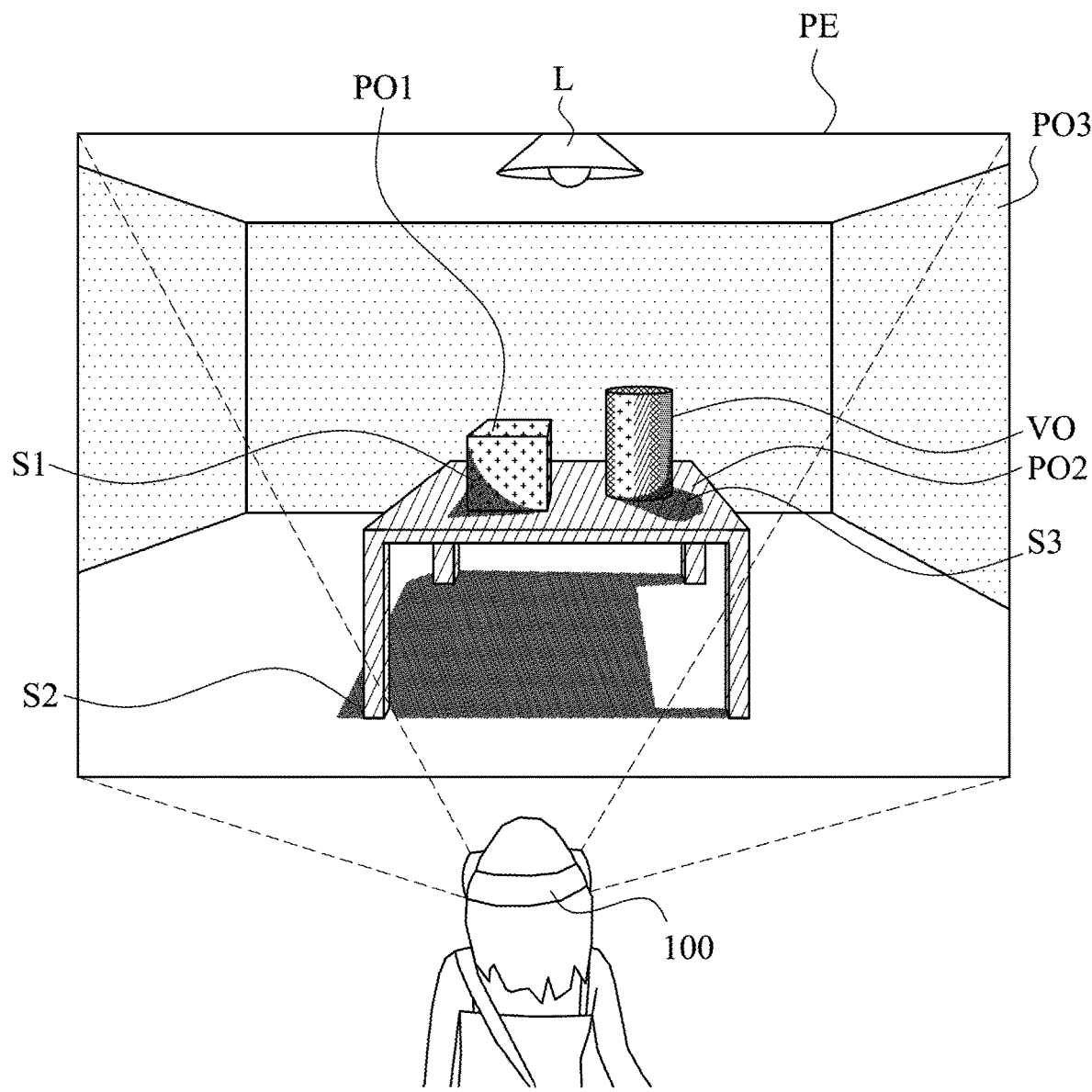
FIG. 9 is a schematic diagram illustrating the virtual object is rendered in the physical environment according to an embodiment of this disclosure.

Afterward, the method 200 executes step S246 to generate the shadow S3 corresponding to the virtual object VO according to the lighting vector. Reference is made to FIG. 9, which is a schematic diagram illustrating the virtual object VO is rendered in the physical environment PE according to an embodiment of this disclosure. As shown in FIG. 9, the processor 130 is configured to generate the shadow S3 of the virtual object VO according to the lighting vector. Therefore, the virtual object VO has the shadow S3, due to lighting from the lamp L.

Afterward, the method 200 executes step S250 to render the virtual object VO on an AR image according to the environment light, the reflection, and the shadow by the processor 130. Based on aforesaid embodiment, the virtual object VO generated after the step S240 can be more realistic than the virtual object VO shown in FIG. 5B. The method 200 further executes step S260 to display the AR image by the displayer 150. When the processor 130 is configured to render the virtual object VO, the displayer 150 is configured to display the AR scene SCN. When the virtual object VO rendered by the processor 130 in the physical environment PE according to the environment light, the reflection, and the shadow, the virtual object VO can be more consistent to the real-world object (e.g. objects PO1, PO2 and PO3).

Another embodiment of the disclosure is a non-transitory computer-readable storage medium. The non-transitory computer readable storage medium stores instructions for performing the method 200 for displaying an augmented reality scene in aforesaid embodiment shown in FIG. 2.

Based on aforesaid embodiments, electronic device, method, and non-transitory computer-readable medium for displaying an augmented reality scene are capable of generating a environment image of the physical environment; calculating the environment light, the reflection, and the shadow according to the environment image; and rendering the virtual object on the AR scene according to the environment light, the reflection, and the shadow. In some embodiments, the head-mounted display is able to display the virtual object in the augmented reality scenario.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
   a camera unit, configured for capturing a plurality of images of a physical environment;
   a displayer, configured for displaying an AR image, wherein content of the AR image comprises a virtual object and an object corresponding to the physical environment; and
   a processor, electrically connected to the camera unit and the displayer, configured to:
      stitch the plurality of images to generate an environment image;
      calculate an environment light and a reflection of the physical environment corresponding to the virtual object according to the environment image;
      analyze direction of a lighting to calculate a shadow corresponding to the virtual object according to the environment image, further comprising:
         spitting the environment image into a plurality of regions according to the total luminance, wherein luminance of the plurality of regions is equal to each other;
         sorting the plurality of regions according to size of each region to generate a sorting result;
         selecting region according to the sorting result, and generating at least one directional light corresponding to selected region;
         calculating a lighting vector corresponding to the at least one directional light according to position of selected region and position of the virtual object; and
         generating the shadow corresponding to the virtual object according to the lighting vector; and
      render the virtual object on the AR image according to the environment light, the reflection, and the shadow.

2. The electronic device of claim 1, wherein the camera unit is configured to capture one of the plurality of images, when a view point is matched with one of a plurality of matching targets, wherein the view point is moved and rotated along with the electronic device, and the plurality of matching targets are around the view point.

3. The electronic device of claim 1, wherein the processor is configured to receive the plurality of images from the camera unit, wherein each image corresponds to a position of the camera unit.

4. The electronic device of claim 3, the processor is further configured for executing the following steps:

calculating a quality of a current image according to a distance between a current position and an initial position;
   if the quality of the current image is larger than a threshold, stitching the current image into the environment image; and
   wherein one of the plurality of images is an initial image, and the initial image corresponds to the initial position of the camera unit.

5. The electronic device of claim 1, wherein the processor is further configured for utilizing a spherical harmonics function to calculate the environment light corresponding to the virtual object according to the environment image.

6. The electronic device of claim 1, wherein the processor is further configured for generating a cube map according to the environment image, and calculating the reflection corresponding to the virtual object according to the cube map.

7. A method for displaying an augmented reality scene, comprising:
   capturing a plurality of images of a physical environment by a camera unit;
   stitching the plurality of images to generate an environment image by a processor;
   calculating an environment light and a reflection of the physical environment corresponding to a virtual object according to the environment image by the processor;
   analyzing direction of a lighting to calculate a shadow corresponding to the virtual object according to the environment image by the processor, further comprising:
      splitting the environment image into a plurality of regions according to the total luminance, wherein luminance of the plurality of regions is equal to each other;
      sorting the plurality of regions according to size of each region to generate a sorting result;
      selecting region according to the sorting result, and generating at least one directional light corresponding to selected region;
      calculating a lighting vector corresponding to the at least one directional light according to position of selected region and position of the virtual object; and
      generating the shadow corresponding to the virtual object according to the lighting vector;
   rendering the virtual object on an AR image according to the environment light, the reflection, and the shadow by the processor; and
   displaying the AR image by a displayer, wherein content of the AR image comprises the virtual object and an object corresponding to the physical environment.

8. The method of claim 7, wherein the camera unit is configured to capture one of the plurality of images, when an initial view point is matched with one of a plurality of matching targets, wherein the initial view point is moved and rotated along with an electronic device, and the plurality of matching targets is around the initial view point.

9. The method of claim 8, wherein the step of calculating the reflection of the physical environment corresponding to the virtual object, further comprising:
   generating a cube map according to the environment image, and calculating the reflection corresponding to the virtual object according to the cube map by the processor.

10. The method of claim 7, wherein the processor is configured to receive the plurality of images from the camera unit, wherein each image corresponds to a position of the camera unit.

11. The method of claim 10, wherein the step of stitching the plurality of images to generate the environment image by the processor, further comprising:
- calculating a quality of a current image according to a distance between a current position and an initial position by the processor;
- if the quality of the current image is larger than a threshold, stitching the current image into the environment image; and
- wherein one of the plurality of images is an initial image, and the initial image corresponds to the initial position of the camera unit.

12. The method of claim 7, wherein the step of calculating the environment light corresponding to the virtual object, further comprising:
- utilizing a spherical harmonics function to calculate the environment light corresponding to the virtual object according to the environment image by the processor.

13. A non-transitory computer-readable medium including one or more sequences of instructions to be executed by a processor of an electronic device for performing a method for displaying an augmented reality scene, wherein the method comprises:
- capturing a plurality of images of a physical environment by a camera unit;
- stitching the plurality of images to generate an environment image by a processor;
- calculating an environment light and a reflection of the physical environment corresponding to a virtual object according to the environment image by the processor;
- analyzing direction of a lighting to calculate a shadow corresponding to the virtual object according to the environment image by the processor, further comprising:
  - splitting the environment image into a plurality of regions according to the total luminance, wherein luminance of the plurality of regions is equal to each other;
  - sorting the plurality of regions according to size of each region to generate a sorting result;
  - selecting region according to the sorting result, and generating at least one directional light corresponding to selected region;
  - calculating a lighting vector corresponding to the at least one directional light according to position of selected region and position of the virtual object; and
  - generating the shadow corresponding to the virtual object according to the lighting vector;
- rendering the virtual object on an AR image according to the environment light, the reflection, and the shadow by the processor; and
- displaying the AR image by a displayer, wherein content of the AR image comprises the virtual object and an object corresponding to the physical environment.

14. The non-transitory computer-readable medium of claim 13, wherein the camera unit is configured to capture one of the plurality of images, when an initial view point is matched with one of a plurality of matching targets, wherein the initial view point is moved and rotated along with the electronic device, and the plurality of matching targets is around the initial view point.

15. The non-transitory computer-readable medium of claim 13, wherein the processor is configured to receive the plurality of images from the camera unit, wherein each image corresponds to a position of the camera unit.

16. The non-transitory computer-readable medium of claim 15, wherein the step of stitching the plurality of images to generate the environment image by the processor, further comprising:
- calculating a quality of a current image according to a distance between a current position and an initial position by the processor; and
- if the quality of the current image is larger than a threshold, stitching the current image into the environment image; and
- wherein one of the plurality of images is an initial image, and the initial image corresponds to the initial position of the camera unit.

17. The non-transitory computer-readable medium of claim 13, wherein the step of calculating the environment light and the reflection of the physical environment corresponding to the virtual object, further comprising:
- utilizing a spherical harmonics function to calculate the environment light corresponding to the virtual object according to the environment image by the processor; and
- generating a cube map according to the environment image, and calculating the reflection corresponding to the virtual object according to the cube map by the processor.

* * * * *